US010560518B2

(12) United States Patent
Agrawal et al.

(10) Patent No.: US 10,560,518 B2
(45) Date of Patent: Feb. 11, 2020

(54) CLOUD INFRASTRUCTURE OPTIMIZATION THROUGH CLIENT REQUEST CLASSIFICATION

(71) Applicant: Oracle International Corporation, Redwood Shores, CA (US)

(72) Inventors: Manish Agrawal, Bangalore (IN); Ankur Prakash, Bangalore (IN); Sandeep Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 299 days.

(21) Appl. No.: 15/464,741

(22) Filed: Mar. 21, 2017

(65) Prior Publication Data

US 2018/0278677 A1   Sep. 27, 2018

(51) Int. Cl.
*H04L 29/08*   (2006.01)
(52) U.S. Cl.
CPC ...... *H04L 67/1002* (2013.01); *H04L 67/2842* (2013.01)
(58) Field of Classification Search
CPC .............. H04L 67/1002; H04L 67/2842
USPC .............. 709/217, 223, 226, 227, 229
See application file for complete search history.

(56) References Cited

U.S. PATENT DOCUMENTS

2017/0063974 A1\* 3/2017 Wang .................. H04L 67/1002
2017/0317932 A1\* 11/2017 Paramasivam ....... H04L 47/125

OTHER PUBLICATIONS

Liuhua Chen et al., "RIAL: Resource Intensity Aware Load Balancing in Clouds", © 2014 IEEE, 9 pages.
Linlin Wu et al., "SLA-based Resource Allocation for Software as a Service Provider (Saas) in Cloud Computing Environments", 2011 11th IEEE/ACM International Symposium on Cluster, Cloud and Grid Computing, © 2011 IEEE, pp. 195-204.
Zeratul Izzah Mohd Yusoh, "Composite SaaS Resource Management in Cloud Computing using Evolutionary Computation", Discipline of Electrical Engineering & Computer Science, Science and Engineering Faculty, Queensland University of Technology Brisbane, Australia, Apr. 2013, 218 pages.

\* cited by examiner

*Primary Examiner* — Chirag R Patel
*Assistant Examiner* — Marshall M McLeod
(74) *Attorney, Agent, or Firm* — Tucker Ellis LLP

(57) ABSTRACT

In accordance with an embodiment, described herein is a system and method for optimizing cloud infrastructure through client request classification in a cloud computing environment. The cloud infrastructure can include one or more high-compute infrastructure instances, and one or more standard-compute infrastructure instances. Each request received at a load balancer can be checked against a request classification cache, to determine whether the request has been classified, and if it has been classified, whether the request can be routed to a high-compute infrastructure instance or a standard-compute infrastructure instance based on a classification of the request. An unclassified request can be classified based on a plurality of request parameters, and threshold values derived from the cloud infrastructure; and can be stored in the request classification cache. Classified requests in the classification cache can be provided to a cloud vendor for use in optimizing the cloud infrastructure.

16 Claims, 9 Drawing Sheets

CLOUD INFRASTRUCTURE OPTIMIZATION THROUGH CLIENT REQUEST CLASSIFICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud services, and are particularly related to a system and method for optimizing cloud infrastructure through client request classification in a cloud computing environment.

BACKGROUND

Wth the tremendous growth in cloud services, cloud vendors can provide a full spectrum of technologies, including infrastructure as a service (IaaS), platform as a service (PaaS) and software as a service (SaaS). It would be desirable for such cloud vendors to leverage their range of capabilities to provide highly scalable and performance-efficient services to their client, while keeping down the costs of procuring and running the underlying infrastructure.

However, the requirement for providing performance-efficient services and the requirement for keeping down infrastructure costs may be contradictory because providing high performance and scalability often involves expensive hardware.

As such, it would be desirable for a cloud vendor to provide an appropriate combination of different types of hardware, for example, hardware that provides good cost-performance ratio, and hardware that provides extreme performance for specific tasks.

SUMMARY

In accordance with an embodiment, described herein is a system and method for optimizing cloud infrastructure through client request classification in a cloud computing environment. The cloud infrastructure can include one or more high-compute infrastructure instances, and one or more standard-compute infrastructure instances. Each request received at a load balancer can be checked against a request classification cache, to determine whether the request has been classified, and if it has been classified, whether the request can be routed to a high-compute infrastructure instance or a standard-compute infrastructure instance based on a classification of the request. An unclassified request can be classified based on a plurality of request parameters, and threshold values derived from the cloud infrastructure; and can be stored in the request classification cache. Classified requests in the classification cache can be provided to a cloud vendor for use in optimizing the cloud infrastructure.

DETAILED DESCRIPTION

Figure 1:
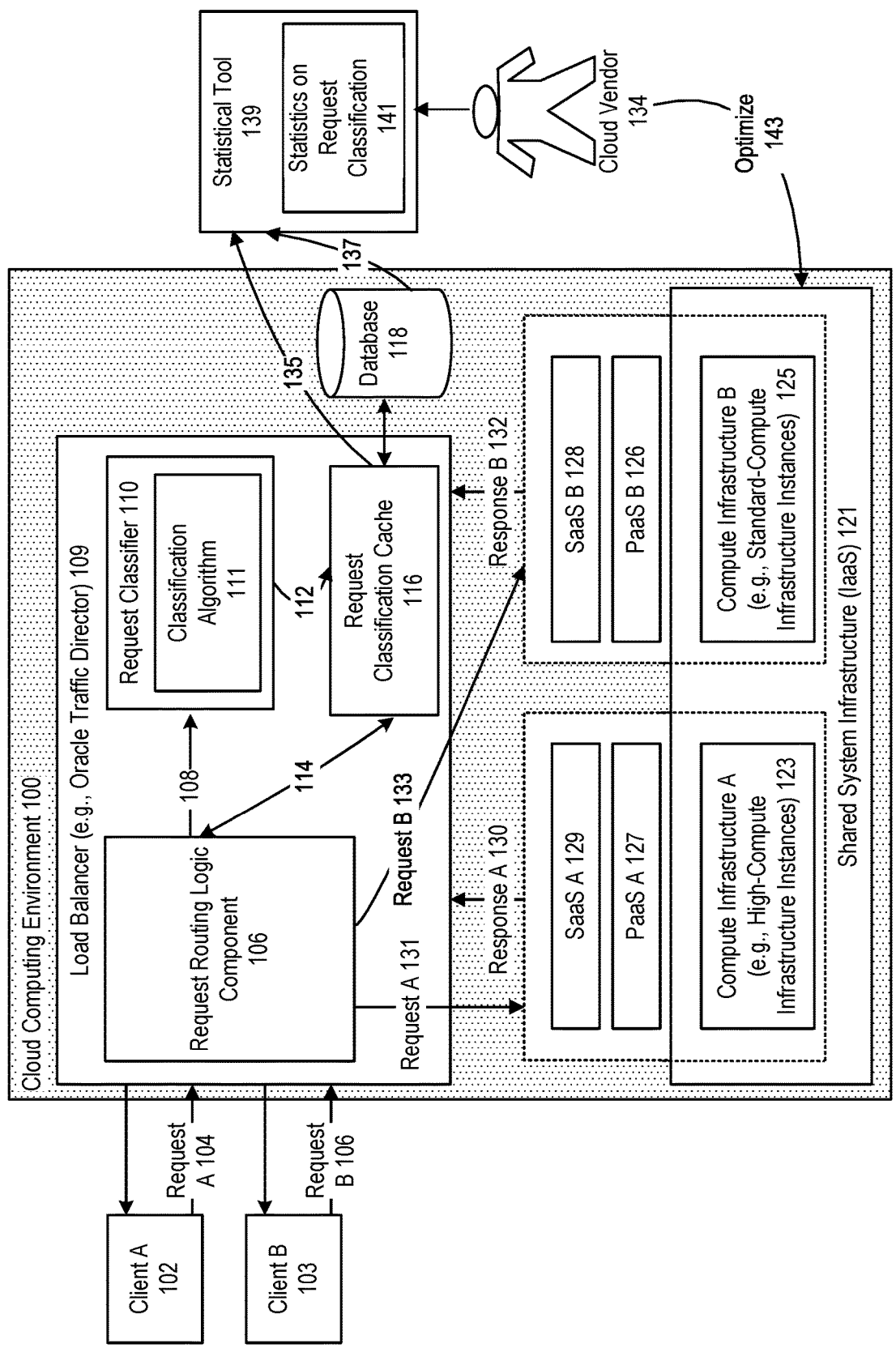
FIG. 1 illustrates a system for optimizing cloud infrastructure through client request classification, in accordance with an embodiment.

The system and method described herein can allow a cloud vendor to optimize their underlying infrastructure required to run SaaS services, so that client requests directed to the SaaS can be efficiently processed without incurring unnecessary infrastructure costs.

In accordance with an embodiment, described herein is a system and method for optimizing cloud infrastructure through client request classification in a cloud computing environment. The cloud infrastructure can include one or more high-compute infrastructure instances, and one or more standard-compute infrastructure instances. Each request received at a load balancer can be checked against a request classification cache, to determine whether the request has been classified, and if it has been classified, whether the request can be routed to a high-compute infrastructure instance or a standard-compute infrastructure instance based on a classification of the request. An unclassified request can be classified based on a plurality of request parameters, and threshold values derived from the cloud infrastructure; and can be stored in the request classification cache. Classified requests in the classification cache can be provided to a cloud vendor for use in optimizing the cloud infrastructure.

As defined herein, in accordance with an embodiment, a high-compute infrastructure instance can be a hardware node that uses a high-performance microprocessor (e.g., Intel Xeon E5-2666 v3 microprocessor) to deliver a high-level level of compute performance. A standard-compute infrastructure instance can be defined as a hardware node that provides a baseline level of CPU performance with the ability to burst above the baseline level.

In accordance with an embodiment, when the load balancer first receives a request, the load balancer can create a request definition for the request based on a plurality of parameters of the request. If the request definition exits in the request classification cache, the request is considered classified. Otherwise, the request is considered unclassified.

In accordance with an embodiment, an unclassified request can be classified using an algorithm based on finding the Euclidean distance of performance values of the request from performance values of a threshold request. The Euclidean distance will define whether the request can be classified as either requiring a high-compute infrastructure instance, or a standard-compute infrastructure instance.

In accordance with an embodiment, the performance values of a request can be computed using a plurality of parameters of the request, for example, the payload size of the request, the payload size of the response to the request, and the processing time taken to process the request.

For each of the plurality of parameters, a threshold value can be determined based on the underlying infrastructure and a boundary where a request is too performance intensive to be computed on a standard-compute infrastructure instance, and instead requires a high-compute infrastructure.

Further, a threshold margin value can be configured based on the difference in compute capabilities of a standard-compute infrastructure instance/node and a high-compute infrastructure instance/node in the cloud computing environment, or the difference in compute capabilities of the standard-compute infrastructure and the high-compute infrastructure in the cloud computing environment.

In accordance with an embodiment, using the performance values, threshold values, and threshold marginal value, a marginal distance can be calculated as the Euclidean distance between one or more of the threshold values and the threshold margin value; and a current request distance can be calculated as the Euclidean distance between one or more of the threshold values and one or more of the performance values of the current request (the request to be classified).

In accordance with an embodiment, the classification of the current request can be determined by comparing the current request distance and the marginal distance. If the current request distance is equal to, or smaller than, the marginal distance, the current request can be classified as requiring a high-compute infrastructure distance; otherwise, the current request can be classified as requiring a stand-compute infrastructure distance.

In an accordance with an embodiment, when a request is classified as requiring a particular type (i.e. high-compute or standard-compute) infrastructure instance, the request can be routed by the load balancer to that type of infrastructure instance.

In accordance with an embodiment, by classifying client requests, the system can enable the underlying cloud infrastructure (e.g., IaaS layer) to be efficiently used, so that each client request directed to an SaaS service can be efficiently processed.

As an illustrative example, a client company (e.g., a tenant of a SaaS service) needs to deliver business analytics for traditional data, and big data across the entire company. Two types of client requests may be received by the SaaS service. The first type of client requests enables the client company to obtain real-time insights into an inventory balance and savings, and can involve repeated client requests with each request dealing with small amounts of data and less processing required at the server side. The second type of client requests enables the client company to perform a historical and predictive analysis of its product sales, and can involve one or two client calls dealing with huge amount of historical data being processed at the server side.

In accordance with an embodiment, using the features described above, the first type of client requests can be routed to one or more standard-compute infrastructure instances, since the compute requirements for the client requests can be low; and the second type of client requests can be routed to one or more high-compute infrastructure instances, since the compute requirements for the client requests can be high. Routing different types of requests to different types of infrastructure instances can provide an efficient use of the available infrastructure for cloud vendors, and high performance benefits for clients.

In accordance with an embodiment, the classification information generated by the system can be used to optimize the underlying cloud infrastructure, so that a balance can be struck between performance and cost.

For example, the classification information can be used by a cloud vendor to make strategic decisions regarding their underlying cloud Infrastructure. The cloud vendor can use the classification information to statistically calculate a percentage of high-compute infrastructure instances and standard-compute infrastructure instances required to optimally service clients; and can use the percentage to rebalance the cloud infrastructure, including adjusting the number of certain type of high-performance hardware nodes.

As another example, as the services and features provided by an SaaS service are developed and extended, the classification information can provide a dynamic reference for a cloud vendor to calculate the infrastructure requirements. To illustrate, if a historical analysis tool is added to a stock trading service, the cloud vendor can determine, based on the classification information, whether high-compute infrastructure instances need to be increased, due to the increased number of client requests for historical analyses that are expected on the stock trading service.

Further, the threshold margin value used in the classification algorithm can be used as a dynamic knob by a cloud vendor to shift the boundary between the requirement for standard-compute infrastructure and the requirement for high-compute infrastructure.

For example, if the standard-compute infrastructure is upgraded, the cloud vendor can reduce the threshold margin value, which can cause the standard-compute infrastructure to start handling more compute-intensive tasks, and the required percentage of high compute infrastructure to decrease.

Request Classification

FIG. 1 illustrates a system for optimizing cloud infrastructure through client request classification, in accordance with an embodiment.

In accordance with an embodiment, a cloud computing environment 100 enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include:

Software as a Service (SaaS), in which consumers use software applications that are running upon a cloud infrastructure, while a SaaS provider manages or controls the underlying cloud infrastructure and applications.

Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment).

Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer).

The above examples are provided to illustrate some of the types of environment within which embodiments of the invention can generally be used. In accordance with various embodiments, the systems and methods described herein can also be used with other types of cloud or computing environments.

As shown in FIG. 1, a shared system and infrastructure layer 121 can be the IaaS layer described above. The shared system and infrastructure layer can include two types of hardware instances: compute infrastructure A 123 and compute infrastructure B 125.

In accordance with an embodiment, compute infrastructure A can include one or more high-compute infrastructure instances (i.e. nodes) that each can use a high-performance microprocessor (e.g., Intel Xeon E5-2666 v3 microprocessor) to deliver a high-level compute performance. Compute infrastructure B can include one or more standard-compute infrastructure instances (i.e. nodes) that each can provide a baseline-level CPU performance with the ability to burst above the baseline level.

In accordance with an embodiment, each of compute infrastructure A and compute infrastructure B can support a PaaS layer (for example, PaaS A 127 and PaaS B 126) and an SaaS layer (for example, SaaS A 129 and SaaS B 128).

As further shown in FIG. 1, the cloud computing environment can further include a request routing logic component 106, a request classifier 110, and a request classification cache 116 in a load balancer 109 (for example, Oracle Traffic Director). The load balancer can receive HTTP requests (for example, request A 104 and request B 106) from a plurality of clients (for example, client A 102 and client B 103) directed to SaaS services in the cloud computing environment.

In accordance with an embodiment, when receiving a request, the load balancer can determine if the request has been classified before by checking a plurality of properties of the request.

Based on the above properties, a request definition (for example, an MA-AN-SA request definition) can be created. The request routing logic component can check 114 whether a request with the same request definition already exists in the request classification cache. If the same request definition already exists in the request classification cache, the received request is considered classified, and can be routed to an appropriate compute infrastructure instance based on a classification of the request. Otherwise, if the same request definition does not exist in the request classification cache, the received request is considered unclassified, and can be routed to a standard-compute infrastructure instance.

For example, in FIG. 1, an existing request definition that is the same as the request definition created for the received request A can be found in the request classification cache, where the request associated with the existing request definition is classified as requiring a high-compute infrastructure instance. As such, request A can be routed 131 to compute infrastructure A 123.

As another example, the request classification cache does not include a request definition that is the same with the request definition created for request B. As such, request B is considered unclassified, and can be routed 133 to compute infrastructure B 125.

In accordance with an embodiment, before returning a response (for example, response A 130 or response B 132) to a client, the load balancer can check the request classification cache again to determine whether a request has been classified. If the request has not been classified, the load balancer can invoke the request classifier 110 to classify that request in accordance with a classification algorithm 111. When classifying the request, the request classifier can consider a plurality of parameters that define the performance metrics of the request, including the payload size of the request, the payload size of the response to the request, and the processing time for the request.

In accordance with an embodiment, a classification result of the request can be stored 112 in the request classification cache, which is configured to be persisted at a configurable regular interval to a database 118 or another persistence store. During a start time, a provision time, or a migration time, the request classification cache can be initialized from the database or another persistence store, for use by the system.

As further shown in FIG. 1, a cloud vendor 134 that provides IaaS services, PaaS services and SaaS services can use a statistical tool 139 to compute statistics 141 on request classification retrieved 135, 137 either from the request classification cache or from the database; and can use the statistics to optimize 143 the cloud infrastructure.

Figure 2:
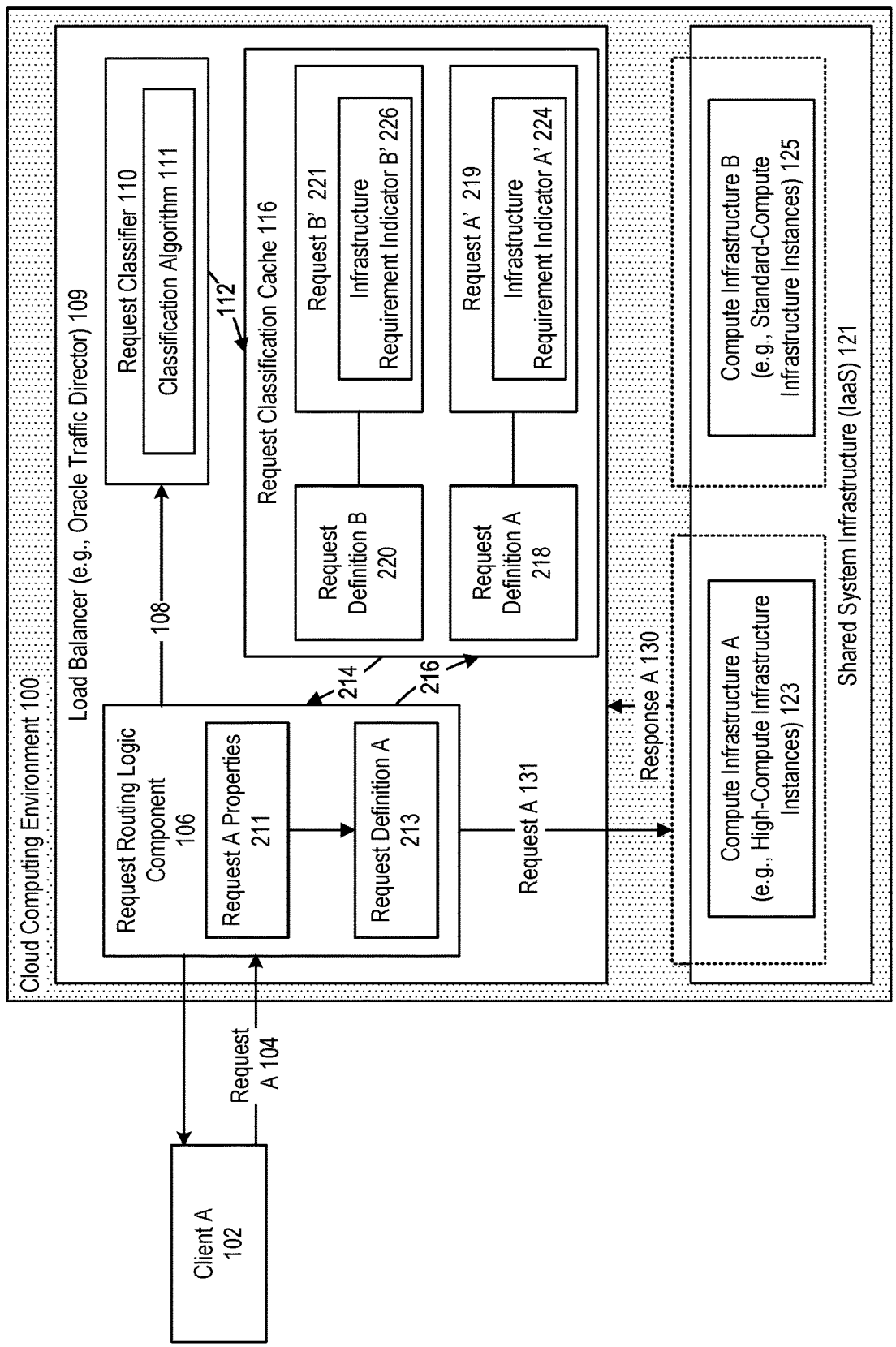
FIG. 2 further illustrates a system for optimizing cloud infrastructure through client request classification, in accordance with an embodiment.

FIG. 2 further illustrates a system for optimizing cloud infrastructure through client request classification, in accordance with an embodiment.

As shown in FIG. 2, the request routing logic component can create a request definition A 213 from a plurality of properties 211 of request A. The plurality of properties can include the scope of resource access, for example, for an account or for a particular customer; the type of operation, for example, GET or POST; the request payload size; and the parameter name list.

In accordance with an embodiment, the load balancer can use a plurality of routing rules to determine whether to route request A to a high-compute infrastructure instance or a standard-compute infrastructure instance, based on whether the request definition for a particular request exists in the request classification cache, and, if the request definition exists, how a request associated with the request definition is classified in the request classification cache.

Table 1 below illustrates example routing rules, in accordance with an embodiment.

TABLE 1

| Request Definition Exists in Request Classification Cache? | Classification in Request Classification Cache | Load Balancer Action |
|---|---|---|
| No | — | Request is routed to standard compute infrastructure and then later classified and added to request classification cache. |
| Yes | High-Compute | Request is routed to high compute infrastructure |
| | Standard-Compute | Request is routed to standard compute infrastructure. |

As shown in FIG. 2, the load balancer can enforce the rules shown in Table 1 above by checking 216 whether request definition A exists in the request classification cache 116 that include a request definition A 218 and a request definition B 220.

In accordance with an embodiment, each request in the request classification cache can be a representation of a plurality of requests that share the same request definition as the existing request definition associated with that request.

For example, if client A sends multiple requests, and each request can include properties for the load balancer to create the same request definition as request definition A', then each of the multiple requests from client A can be considered classified.

Each request definition can be associated with a request, for example, request A' 219 and request B' 221. Each request can include an infrastructure requirement indicator, for example, infrastructure requirement indicator A' 224 and infrastructure requirement indicator B' 226.

In accordance with an embodiment, each infrastructure requirement indicator can indicate whether a request should be routed to a high-compute infrastructure instance or a standard-compute infrastructure instance.

As an illustrative example, infrastructure requirement indicator A' can specify that a request with this indicator should be routed to a high-compute infrastructure instance. As such, after obtaining 214 a result from the request classification cache, the request routing logic component can route 131 request A to compute infrastructure A which can include one or more high-compute infrastructure instances.

Figure 3:
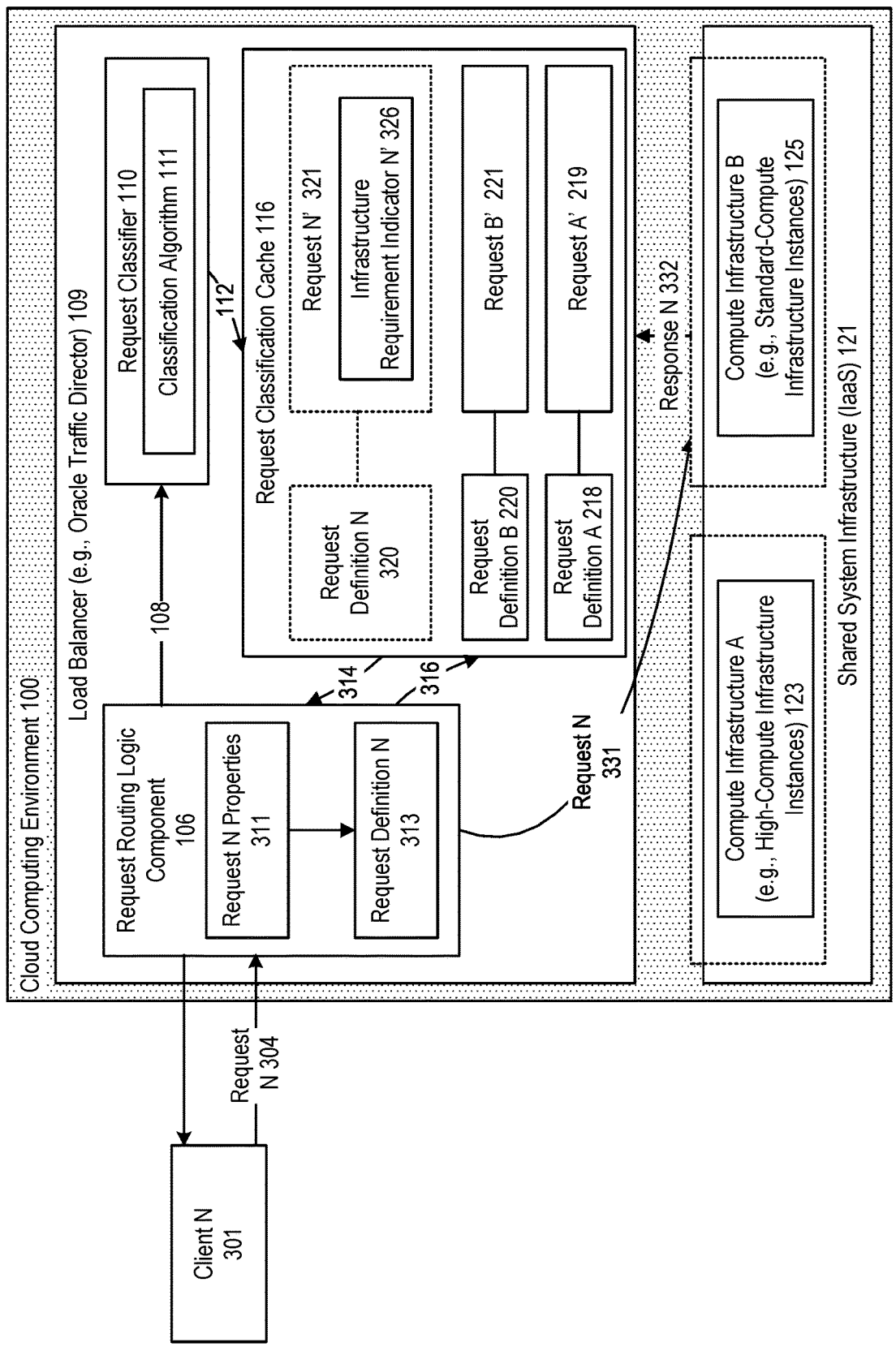
FIG. 3 further illustrates a system for optimizing cloud infrastructure through client request classification, in accordance with an embodiment.

FIG. 3 further illustrates a system for optimizing cloud infrastructure through client request classification, in accordance with an embodiment.

More particularly, FIG. 3 illustrates an embodiment where no request definition exists for a current request in the request classification cache.

As shown in FIG. 3, the existing request definitions in the request classification cache only include request definition A 218 and request definition B 220.

As such, when request definition N 313, which is created from a plurality of properties 311 of request N 304 received at the load balancer, is checked 316 against the request classification cache, a result indicating that no such request definition exists can be received 314 by the request routing logic component.

Based on the result, the request routing logic component can route request N 331 to compute infrastructure B 125 which can include one or more standard-compute infrastructure instances.

As further shown, before returning response N 332 to client N 301, the load balancer can invoke the request classifier 110 to classify request N, and update the request classification cache with request definition N 320, request N' 321 and infrastructure requirement indicator N' 326 included therein.

Classification Algorithm

Figure 4:
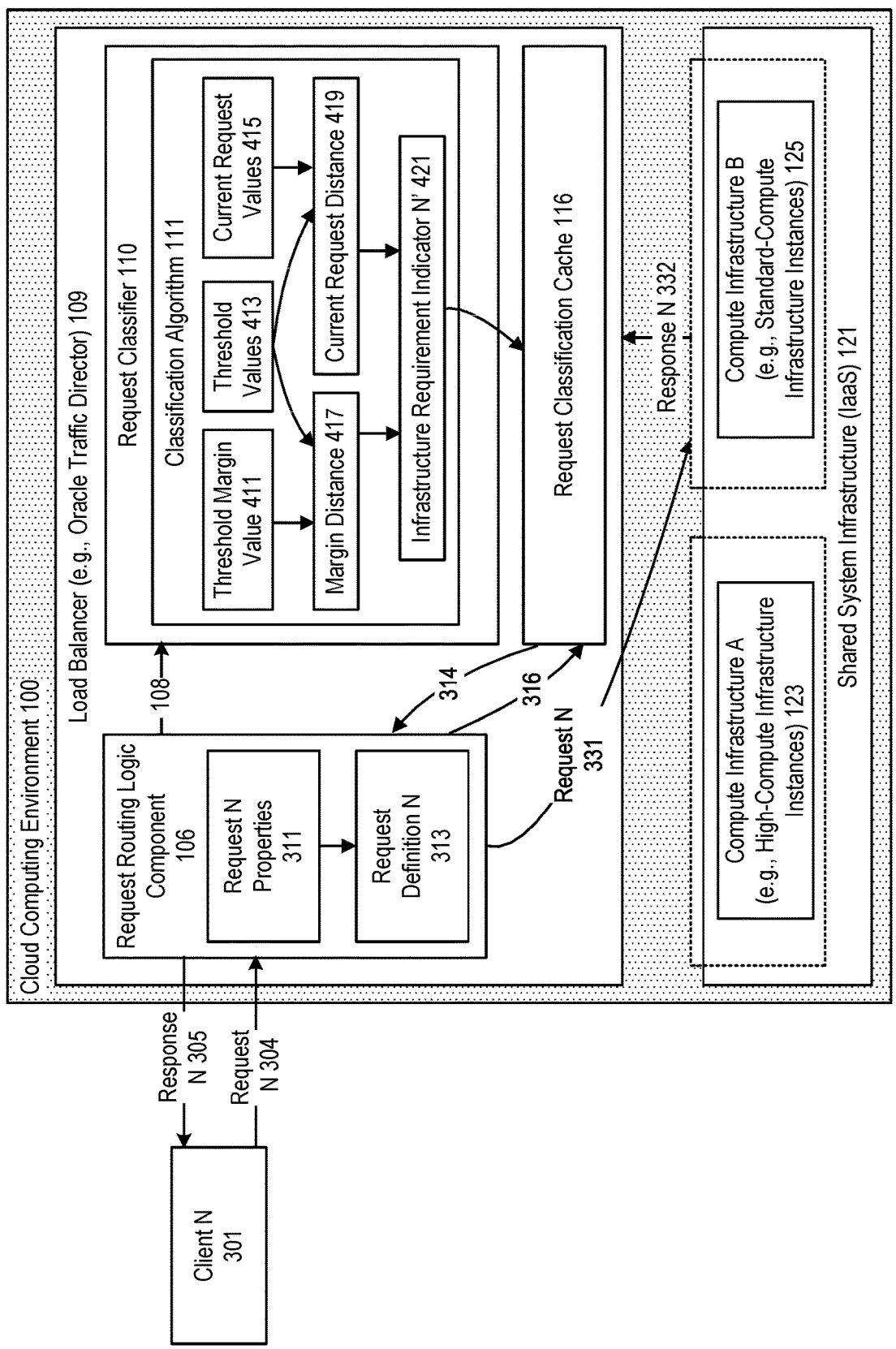
FIG. 4 further illustrates a system for optimizing cloud infrastructure through client request classification, in accordance with an embodiment.

FIG. 4 further illustrates a system for optimizing cloud infrastructure through client request classification, in accordance with an embodiment.

In accordance with an embodiment, the classification algorithm 110 can be based on finding a marginal distance 417 (i.e. a Euclidean distance between threshold values 413 and a threshold margin value 411), and a current request distance 419 (i.e. a Euclidean distance between the threshold values 413 and current request values 415).

In accordance with an embodiment, the threshold values, the threshold margin value, and the current request values can be derived from the current request, a response to the current request, and/or the compute infrastructures (i.e., compute infrastructure A and compute infrastructure B).

For example, the threshold margin value 411 can be configured based on the difference in compute capabilities of a standard-compute infrastructure instance/node and a high-compute infrastructure instance/node in the cloud computing environment. The current request values can be performance values of the current request in terms of a plurality of parameters, for example, the payload size of the request, the payload size of the response to the request, and the processing time taken to process the request. The threshold values 413 can be determined for the plurality of parameters, and can be based on the underlying infrastructure and a boundary where a request is too performance-intensive to be computed on a standard-compute infrastructure instance, and therefore requires a high-compute infrastructure instance.

In accordance with an embodiment, using the threshold values, and the threshold marginal value, and the current request values, the following two Euclidian distances can be calculated:

Marginal Distance: Euclidean distance between the threshold values and the threshold margin value.

Current Request Distance: Euclidean distance between the threshold values and the current request values.

The current request can then be classified as follows:

```
If (Current Request Distance <= Marginal Distance)
    classify it as HIGH Compute Required
Else
    classify it as STANDARD Compute Required.
```

A classification result of the current request can be indicated by an infrastructure requirement indicator N' 421 as shown in FIG. 4.

In accordance with an embodiment, the algorithm can be illustrated in details as follows.

In accordance with an embodiment, the following function checks if a request is already classified and available in the request classification cache or not. If the request has not been classified, the request can be routed to a standard-compute infrastructure instance, and the load balancer can perform an analysis of the request after a response to the request is available.

```
function routeRequest (Request)
    Step1 - RequestDefinition requestDefinition = buildRequestDefinition (Request)
    Step2 - String computeType = Cache.getComputeType (requestDefinition)
    Step3 - IF (computeType != NULL)
        IF (compuetType = 'HIGH_COMPUTE')
            Delegate Request to HIGH_COMPUTE_INFRA
        Else
            Delegate Request to STANDARD_COMPUTE_INFRA
    Step4 - Else
        Delegate Request To STANDARD_COMPUTE_INFRA
    Step5 - Response received from either HIGH_COMPUTE_INFRA or STANDARD_COMPUTE_INFRA
```

```
Step6 - IF (computeType != NULL)
         Return Response to Calling Client
       Else IF (request.httpMethod == 'GET' OR request.httpMethod == 'PUT' OR
       request.httpMethod == 'POST')
           ComputeType computeType = classifyResource(Request, Response)
           Cache.setComputeType (requestDefinition, computeType)
           Return Response to Calling Client
END
```

In accordance with an embodiment, the following function builds a request definition of the request.

```
function buildRequestDefinition (Request)
    Step1 - build RequestDefinition
        Get METHOD_NAME from REQUEST and set in
        RequestDefinition.method
        Get PARAM_LIST from REQUEST and set in
        RequestDefinition.param_list
        Get PAYLOAD_SIZE from REQUEST and set in
        RequestDefinition.payloadSize
        Get RESOURCE_NAME from REQUEST and set in
        RequestDefinition.res_name
    Step2 - Return RequestDefinition
END
```

In accordance with an embodiment, the following function calculates the Euclidean distances, i.e. the marginal distance, and the current request distance.

function getEuclideanDistance (processingTime, responsePayloadSize, RequestDefinition)

As a first step, as shown in Table 2, the following constants and variables can be defined.

TABLE 2

| Symbol | Description | Obtained From |
|---|---|---|
| $Th_T$ | Threshold Time | Constant Decided Based on Infrastructure as Described Below |
| $Th_{RSPS}$ | Threshold Response Payload Size | Constant Decided Based on Infrastructure as Described Below |
| $Th_{RQPS}$ | Threshold Request Payload Size | Constant Decided Based on Infrastructure as Described Below |
| $W_T$ | Weightage of Time | Constant Decided Based on Infrastructure as Described Below |
| $W_{RSPS}$ | Weightage of Response Payload Size | Constant Decided Based on Infrastructure as Described Below |
| $W_{RQPS}$ | Weightage of Request Payload Size | Constant Decided Based on Infrastructure as Described Below |
| M | Margin of Threshold | Constant Decided Based on Infrastructure as Described Below |
| $CR_T$ | Current Request Processing Time | Calculated Performance Metric Passed as "processingTime" Parameter to "getEuclideanDistance" Function |
| $CR_{RQPS}$ | Current Request Payload Size | Calculated Performance Metric That Is Equal to "RequestDefinition.payloadSize" Where "RequestDefinition" Is a Parameter Passed to "getEuclideanDistance" Function |
| $CR_{RSPS}$ | Current Response Payload Size | Calculated Performance Metric Passed as "responsePayloadSize" Parameter to "getEuclideanDistance" Function |
| $CR_d$ | Current Request Euclidian Distance | Calculated Value |
| $M_d$ | Marginal Euclidian Distance | Calculated Value |

As a second step, one or more values in Table 2 can be normalized as follows:

```
If (CR_T > Th_T)
    CR_T = Th_T
If (CR_RQPS > Th_RQPS)
    CR_RQPS = Th_RQPS
If (CR_RSPS > Th_RSPS)
    CR_RSPS = Th_RSPS
```

As a third step, a data structure (i.e., eDistance) can be created as follows to include the two Euclidean distances described above.

If (RequestDefinition.method=='GET')
  Marginal Euclidian Distance is calculated using the below formula and set to eDistance.marginalDistance $$M_d = \sqrt{((Th_T - Th_T(1-M)) \times W_T)^2 + ((Th_{RSPS} - Th_{RSPS}(1-M)) \times W_{RSPS})^2}$$

Euclidian Distance of the Current Request is calculated using the below formula and set to eDistance.requestDistance $$CR_d = \sqrt{((Th_T - CR_T) \times W_T)^2 + ((Th_{RSPS} - CR_{RSPS}) \times W_{RSPS})^2}$$

ELSE
  Marginal Euclidian Distance is calculated using the below formula and set to eDistance.marginalDistance $$M_d = \sqrt{((Th_T - Th_T(1-M)) \times W_T)^2 ((Th_{RQPS} - Th_{RQPS}(1-M)) \times W_{RQPS})^2 + ((Th_{RSPS} - Th_{RSPS}(1-M)) \times W_{RSPS})^2}$$

Euclidian Distance of the current request is calculated using the below formula and set to eDistance.requestDistance $$CR_d = \sqrt{((Th_T - CR_T) \times W_T)^2 ((Th_{RQPS} - CR_{RQPS}) \times W_{RQPS})^2 + ((Th_{RSPS} - CR_{RSPS}) \times W_{RSPS})^2}$$

As a fourth step, the data structure (i.e., eDistance) can be returned.
END

In accordance with an embodiment, the following function classifies the request, i.e., whether it requires HIGH or STANDARD compute infrastructure.

function classifyResource (Request, Response) returns ComputeType
    Step 1—int processingTime=Time taken to process the request
    Step 2—RequestDefinition requestDefinition=build RequestDefinition (Request)
    Step 3—int responsePayloadSize=Size of the response payload
    Step 4—EuclideanDistance eDistance=getEuclideanDistance (processingTime, responsePayloadSize, requestDefinition)
    Step 5—IF (eDistance.requestDistance<=eDistance.marginalDistance)

```
            Return HIGH_COMPUTE
    ELSE
            Return STANDARD_COMPUTE
    END
```

Figure 5:
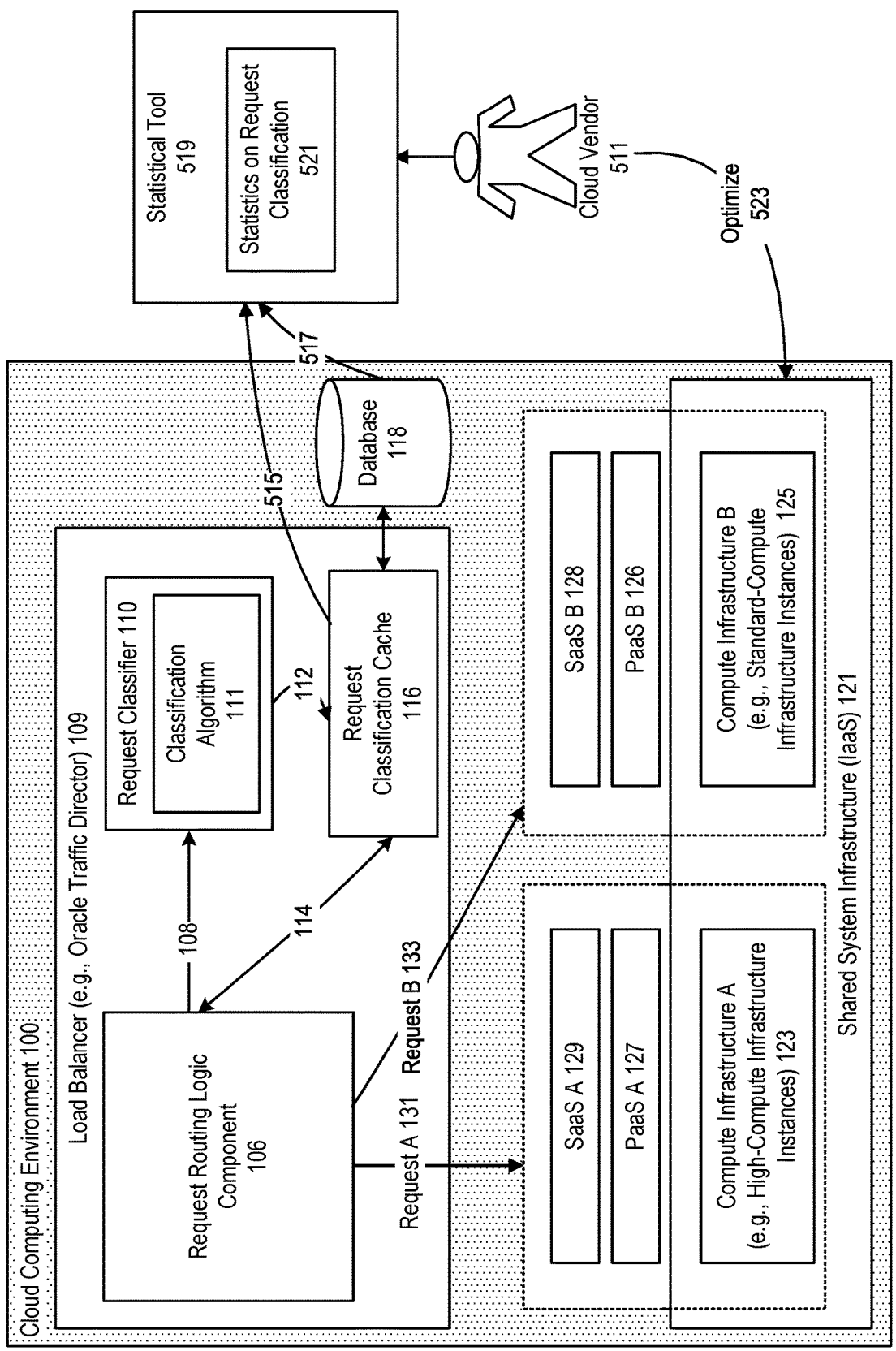
FIG. 5 further illustrates a system for optimizing cloud infrastructure through client request classification, in accordance with an embodiment.

FIG. 5 further illustrates a system for optimizing cloud infrastructure through client request classification, in accordance with an embodiment.

In accordance with an embodiment, request classification information stored in the request classification cache or the database can be used by a cloud vendor to optimize the underlying infrastructure required to optimally run SaaS services.

With the optimization, high performance and scalability to the clients can be provided by the underlying infrastructure, with a low cost of procuring and running the underlying infrastructure.

As an illustrative example, the cloud infrastructure (hardware instances in the IaaS layer) of a cloud vendor can be optimized as follows:

1). Route client requests to appropriate compute infrastructure instances to optimally make use of the provided compute infrastructure instances.
2). Statistically calculate, by the cloud vendor, the amount of high/standard compute infrastructure instances required, based upon the number of client requests classified as requiring high/standard compute as stored in the request classification cache. For example, by running an analysis on the cache, the cloud vendor can decide the percentage of costly high compute infrastructure required to optimally service the client requests, so that the underlying infrastructure can be rebalanced in accordance with the percentage.
3). Provide by the request classification cache a dynamic reference for the cloud vendor to calculate the infrastructure requirements, as the services and features provided by a SaaS service are developed and extended. For example, if a historical analysis tool is added to a stock trading service, the cloud vendor can dynamically determine if the high-compute infrastructure instances need to be increased due to the number of client requests for historical analyses.
4.) Use the Margin of Threshold value in the algorithm as a dynamic knob to shift the boundary between standard and high compute requirements. Thus, if the standard compute infrastructure is upgraded, just reducing the value of the Margin of threshold would mean that the standard compute infrastructure would start handling more compute intensive tasks, and that the percentage of high compute infrastructure required would decrease accordingly.

As illustrated in FIG. 5, a cloud vendor 511 that provides IaaS services, PaaS services and SaaS services can use a statistical tool 519 to compute statistics 521 on request classification information retrieved 515, 517 either from the request classification cache or from the database; and can use the statistics to optimize 523 the cloud infrastructure as described above.

Calculation of the Weights, Thresholds and Margin of Threshold

In accordance with an embodiment, the values for the various constants in Table 2 can be determined as described below. The method described herein is being provided for the purpose of illustration and does not limit a cloud vendor to use only the below method to determine the values of these constants. The actual values and formulas used can differ based on various factors including but not limited to:

1). The actual difference between the compute capabilities of the standard-compute versus the high-compute infrastructure;
2). The amount of hardware procured and the maintenance cost incurred by a cloud vendor for the standard-compute infrastructure versus the high-compute infrastructure; and
3). The maximum acceptable amount of time to a client that the system takes to process a request from the client and return a response, as determined by the cloud vendor.

In accordance with an embodiment, the cloud vendor first needs to collect data about the types of client requests over a period of time (e.g., 15 days) and what the observed performance is when such requests are computed on standard-compute as well as high-compute nodes, to provide a base for calculations. The data can include each request's payload size ($R_{RQPS}$), time taken for each request to be processed ($R_T$), and each response's payload size ($R_{RSPS}$).

In accordance with an embodiment, the data sample needs to be of sufficient size so as to include most, if not all, types of client requests which a service is expected to receive. The sample size can be denoted as "n" where n is the number of requests for which the data has been collected as part of the sample.

Next, the cloud vendor can calculate the mean and standard deviation of the sample for each of the three parameters (e.g., $R_{RQPS}$, $R_T$ and $R_{RSPS}$).

In accordance with an embodiment, the mean of the sample for each parameter can be calculated using the following formula:

$$\overline{X} = \frac{\sum_{i=1}^{n} X_i}{n}$$

The standard deviation of the sample for each parameter can be calculated using the following formula:

$$s_x = \sqrt{\frac{\sum_{i=1}^{n}(x_i - \overline{x})^2}{n-1}}$$

In the two formulas above, X can represent any of the three parameters, n is the sample size, $X_i$ is the $i^{th}$ value of X, $S_x$ is the standard deviation for X, and $\overline{X}$ is the mean of the sample data for X.

As such, using the formulas described above, the means ($\overline{R_{RQPS}}$, $\overline{R_T}$, and $\overline{R_{RSPS}}$) and standard deviations ($S_{RQPS}$, $S_T$ and $S_{RSPS}$) for the parameters $R_{RQPS}$, $R_T$, and $R_{RSPS}$ can be calculated.

In accordance with an embodiment, the weights of the three parameters ($W_T$, $W_{RSPS}$ and $W_{RQPS}$) can be calculated by taking the inverse of variance (standard deviation squared) using the following formula:

$$W_x = \frac{1}{S_x^2}$$

In accordance with an embodiment, the weight of a variable (i.e. parameter) with a high variance is low, while the weight of a variable with a low variance is high. This ensures that when calculating the Euclidean distance, the contributions from each of the variables is balanced. The above formula does not restrict the cloud vendor to tweak the weights based on the importance of a certain parameter over the other. For example, if the cloud vendor considers the time taken for a request to be processed is of higher importance than the response payload size, the cloud vendor can decide to slightly increase the calculated $W_T$ to denote that.

In accordance with an embodiment, the threshold value for each of the three parameters can be determined by a cloud vendor based on various factors, including but not limited to the actual difference between the compute capabilities of the standard compute versus the high compute infrastructure and the maximum acceptable amount of time to a client that the system takes to process a request from the client and return a response, as determined by the cloud vendor. As such, there can be multiple ways to calculate the threshold values.

For example, the threshold values can be calculated using a computational approach or an analytical approach.

Under the computational approach, in accordance with an embodiment, the cloud vendor can use the mean of the sample data for each parameter/variable as the threshold value for that parameter/variable. Thus, under this approach, the threshold values ($Th_T$, $Th_{RQPS}$ and $Th_{RSPS}$) would be $\overline{R_T}$, $\overline{R_{RQPS}}$, and $\overline{R_{RSPS}}$.

Under the analytical approach, the cloud vendor can analyze the sample request data to compute the thresholds based on the requirements.

Figure 6:
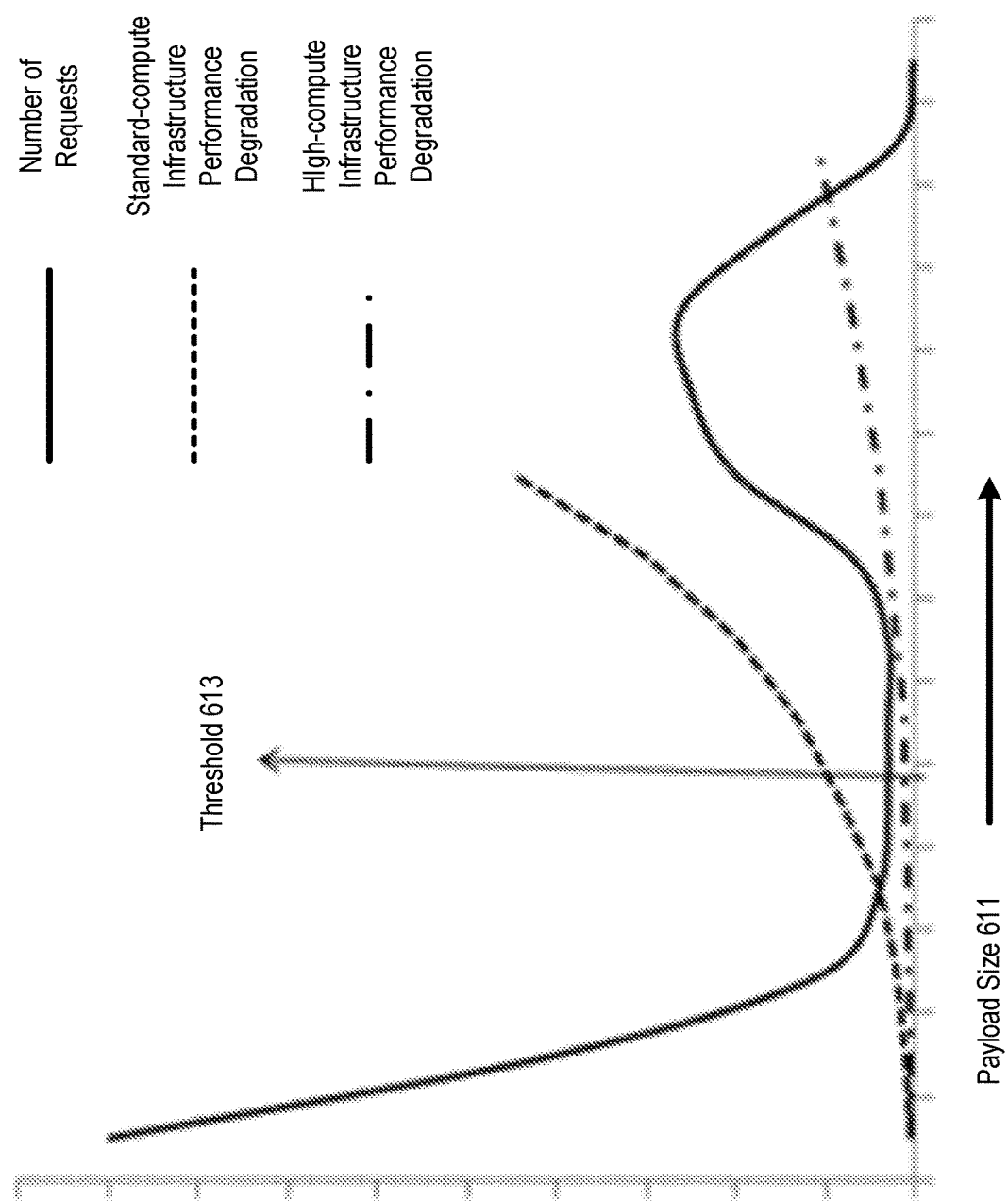
FIG. 6 illustrates an example of computing a threshold value, in accordance with an embodiment.

For example, as shown in FIG. 6, the number of requests received with increasing payload sizes does not vary linearly: Either the payload size is small or it is high. FIG. 6 also shows the performance difference for the two types of compute infrastructure nodes as the payload size 611 increases. Thus, the cloud vendor can make a decision to take the Threshold of payload size as indicated 613, since any request with a higher payload size can take a much longer time to process on a standard-compute node than acceptable. Other threshold values can be similarly computed.

In accordance with an embodiment, the threshold margin (i.e., margin of threshold) can be defined to ensure that requests which lie close to threshold values in one or more parameters without crossing the thresholds, can be routed to a high-compute infrastructure node rather than a standard-compute infrastructure node. The threshold margin is needed since the computation requirements of a request is not defined by a single parameter but is rather defined by multiple parameters such as request payload size, time taken, and response payload size. Thus, even though a request may not cross an individual threshold in any of these parameters, the request may be heavy on computation requirements due to it being near the threshold in all parameters, when the parameters are observed in combination; and thus need to be routed to a high-compute infrastructure node. The threshold margin can be a percentage tolerance against the threshold values to cover these edge cases as described above. Typical values for the threshold margin can range between 2% to 15%.

In accordance with an embodiment, the value for the threshold margin can be affected by the difference in compute capabilities of the two types of compute infrastructures. When the difference in the compute capabilities is high (e.g., the high-compute infrastructure is 50 times more powerful than the standard-compute infrastructure), the value of the threshold margin can be kept a little high to ensure that more of the edge cases described above can be covered by the high-compute infrastructure to avoid performance bottlenecks on the standard-compute infrastructure.

Otherwise, if the difference in the compute capabilities between the two types of compute infrastructures is marginal or low (e.g., the high-compute infrastructure is only twice more powerful than the standard-compute infrastructure), the value of the threshold margin can be kept low since the observable difference in performance would not be very substantial even for edge cases. As such, if the standard-compute infrastructure is upgraded with better hardware, just reducing the margin of threshold would mean that the standard-compute infrastructure would start handling more compute intensive tasks.

In accordance with an embodiment, the margin of threshold can also be affected by the number of nodes in the standard-compute infrastructure versus the number of nodes in the high-compute infrastructure.

For example, if there is only one node in the high-compute infrastructure as compared to multiple nodes in the standard-compute infrastructure, it could be detrimental for the cloud vendor (e.g., a PaaS provider) to keep the margin of threshold high since it would mean that more requests are routed to the single high-compute node. The cloud vendor may find it beneficial in this case to keep the margin of threshold low unless additional nodes are added to the high-compute infrastructure. As such, the margin of threshold can be used as a knob to change the number of requests that are handled by the high-compute infrastructure as compared to the number of requests that are handled by the standard-compute infrastructure once new infrastructure nodes are added.

In accordance with an embodiment, a cloud vendor can determine the margin of threshold based on the infrastructure needs of the cloud vendor.

Figure 7:
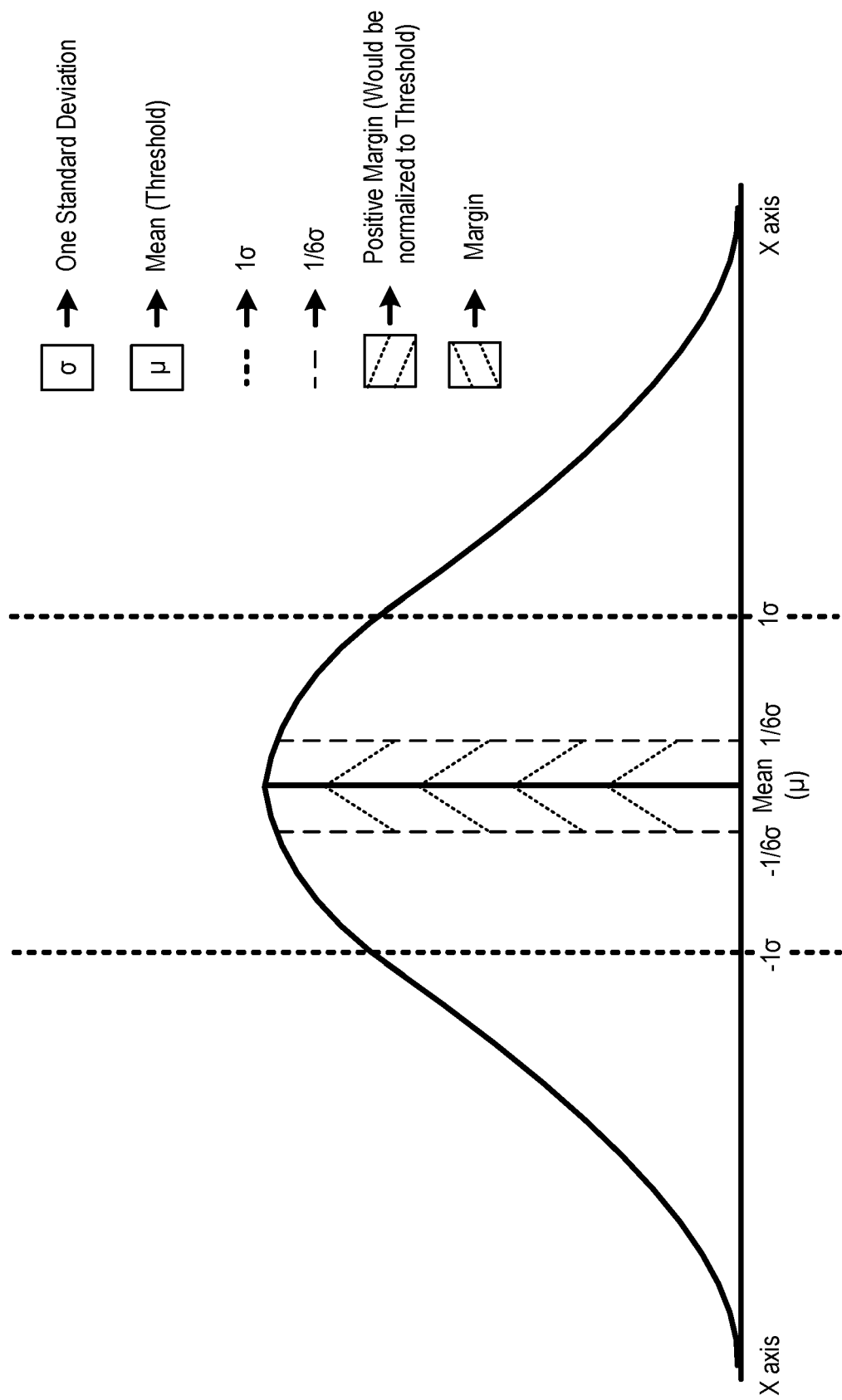
FIG. 7 illustrates an example of computing the margin of threshold, in accordance with an embodiment.

FIG. 7 illustrates an example of computing the margin of threshold, in accordance with an embodiment.

As shown in FIG. 7, the probability distribution of requests is displayed against the processing time on the X axis. As shown in the figure, a higher number of requests are taking the mean processing time. In a standard probability distribution curve, around 68% of the requests lie within ±1a where a denotes the standard deviation calculated above. Similarly, any such vertical slice of the area under the graph can provide a percentage of requests lying within that slice. The margin of threshold can be defined as a vertical slice of area that provides a percentage of the number of requests which deviate by that fraction of $S_T$ ($\sigma$) from the mean.

In accordance with an embodiment, since $Th_T$ is equivalent to the mean µ, and the values for a request can be normalized to the threshold values, the +ve $S_T$ ($\sigma$) does not need to be considered, since any request which deviates above the $Th_T$ is already applying its weight towards high compute processing.

As such, the margin of threshold can be accounted for only by the −ve $S_T$ ($\sigma$), and needs to be defined such that all the potential edge requests discussed above can be covered. Thus, the decision for the cloud vendor is how much fraction of $S_T$ ($\sigma$) should be taken to cover the edge requests as discussed. This could be answered by observing the request density around the mean p in a $S_T$($\sigma$) graph as shown in FIG. 7 and by slightly varying that based upon the infrastructure considerations discussed earlier. If the request is normally distributed, this fraction would lie between be ⅙ σ to ½ σ.

Once the area under the graph for such a vertical slice is computed, a margin of threshold between 2% to 15% can be obtained.

Figure 8:
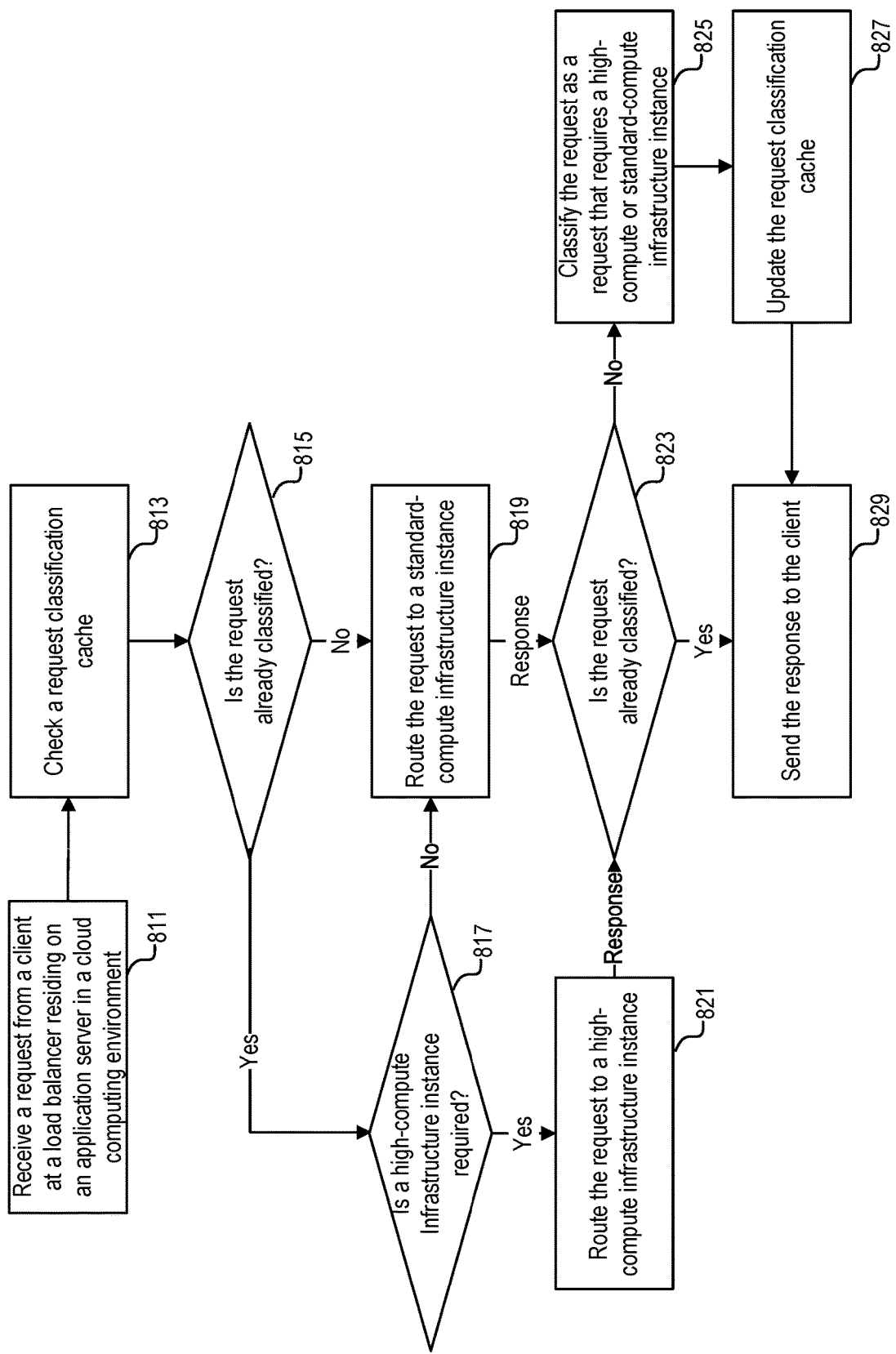
FIG. 8 illustrates a flow chart for optimizing cloud infrastructure through client request classification, in accordance with an embodiment.

FIG. 8 illustrates a flow chart for optimizing cloud infrastructure through client request classification, in accordance with an embodiment.

As shown in FIG. 8, a request for a particular SaaS service can be received 811 from a client at a load balancer in a cloud computing environment. The load balancer can check 813 in a request classification cache to determine if the request has been classified before 815.

To make the determination, the load balancer can create a request definition from a plurality of properties associated with the request, and to check if the request definition exists in the request classification cache.

In accordance with an embodiment, if the request has not been classified before, the load balancer can route 819 the request to a standard-compute infrastructure instance. Otherwise, if the request has been classified before, the load balancer can determine 817 whether a high-compute Infrastructure instance is required for the request based on a classification associated with the request in the request classification cache.

As shown in FIG. 8, if a high-compute infrastructure instance is required for the request, the load balancer can route 821 the request to a high-compute Infrastructure instance. Otherwise, the load balancer can route 819 the request to a standard-compute infrastructure instance.

As further shown in FIG. 8, after a response to the request is available, the load balancer can check the request classification cache again to determine 823 whether the request has been classified. If the request has been classified, the response can be sent 829 to the client. If the request has not been classified, the load balancer can use an algorithm to classify 825 the request, update 827 the request classification cache with the classification, and send the response to the client.

Figure 9:
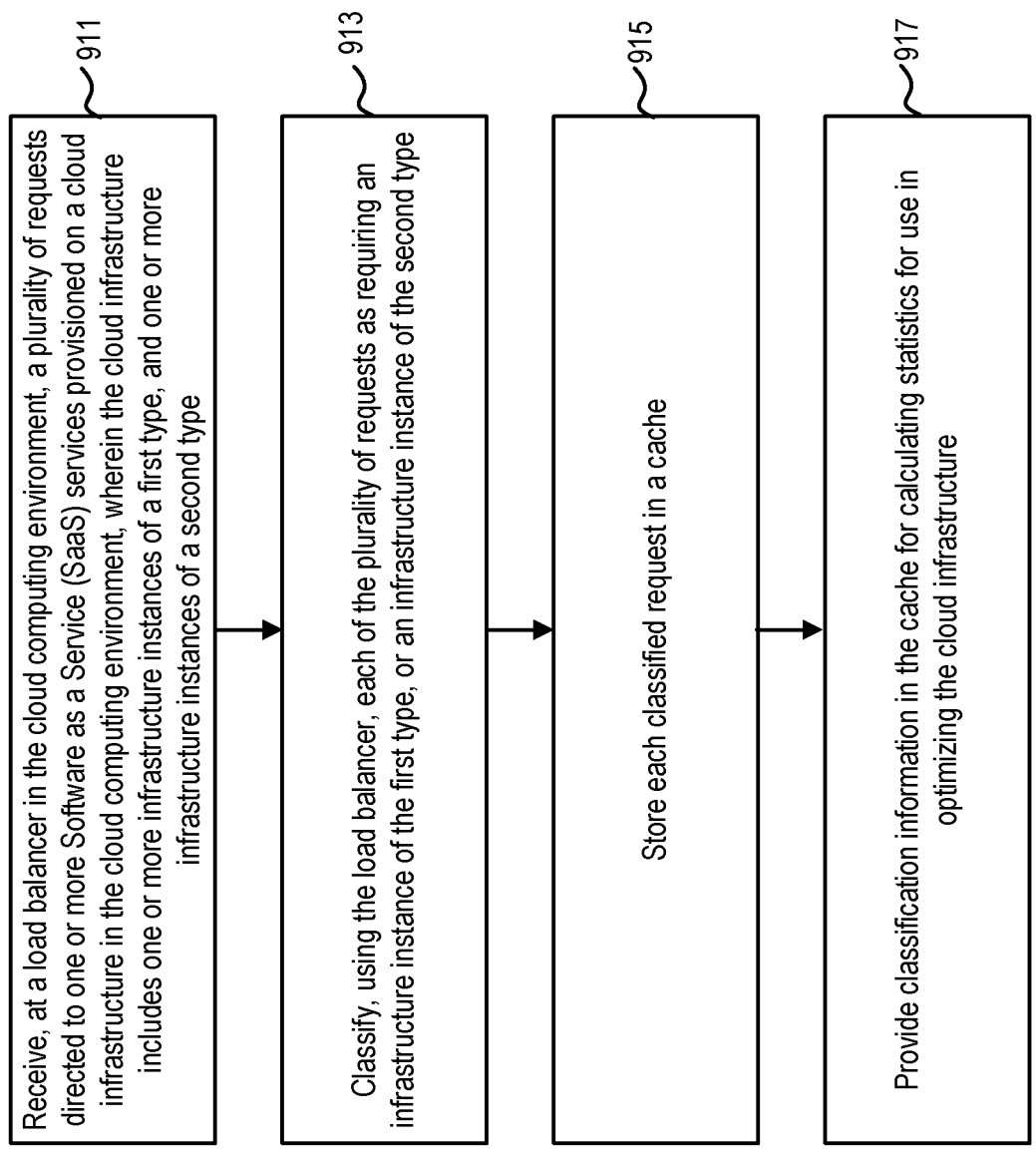
FIG. 9 illustrates a method for optimizing cloud infrastructure through client request classification, in accordance with an embodiment.

FIG. 9 illustrates a method for optimizing cloud infrastructure through client request classification, in accordance with an embodiment.

As shown in FIG. 9, at step 911, a load balancer in a cloud computing environment receives a plurality of requests directed to one or more Software as a Service (SaaS) services provisioned on a cloud infrastructure, wherein the cloud infrastructure includes one or more infrastructure instances of a first type, and one or more infrastructure instances of a second type.

At step 913, the load balancer classifies each of the plurality of requests as requiring an infrastructure instance of the first type, or an infrastructure instance of the second type.

At step 915, the load balancer stores each classified request in a cache.

At step 917, classification information in the cache is provided to a cloud vendor for calculating statistics for use in optimizing the cloud infrastructure.

The present invention may be conveniently implemented using one or more conventional general purpose or specialized digital computing, computing device, machine, or microprocessor, including one or more processors, memory and/or computing readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computing program product which is a non-transitory storage medium or computing readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical discs, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for optimizing a cloud infrastructure in a cloud computing environment through client request classification, the system comprising:
   one or more Software as a Service (SaaS) services executing on the cloud infrastructure in the cloud computing environment, wherein the cloud infrastructure comprises one or more infrastructure instances of a first type, and one or more infrastructure instances of a second type;
   a load balancer that classifies each of a plurality of requests directed to the one or more SaaS services as requiring an infrastructure instance of the first type, or an infrastructure instance of the second type; and
   a cache that stores the plurality of classified requests,
   wherein classification information in the cache is provided for calculating statistics for use in optimizing the cloud infrastructure,
   wherein the optimizing the cloud infrastructure comprises adjusting a number of infrastructure instances of the first type to optimally service the plurality of requests based on a percentage of classified requests directed to an infrastructure instance of the first type.

2. The system of claim 1, wherein each of the first type of infrastructure instances is a high-compute infrastructure node, and wherein each of the second type of infrastructure instances is a standard-compute infrastructure node.

3. A system for optimizing a cloud infrastructure in a cloud computing environment through client request classification, the system comprising:
   one or more Software as a Service (SaaS) services executing on the cloud infrastructure in the cloud computing environment, wherein the cloud infrastructure comprises one or more infrastructure instances of a first type, and one or more infrastructure instances of a second type;
   a load balancer that classifies each of a plurality of requests directed to the one or more SaaS services as requiring an infrastructure instance of the first type, or an infrastructure instance of the second type; and
   a cache that stores the plurality of classified requests, wherein classification information in the cache is provided for calculating statistics for use in optimizing the cloud infrastructure, wherein the load balancer constructs a request definition from a plurality of properties of each request, and determines whether the request has been previously classified based on whether the request definition exists in the cache.

4. The system of claim 3, wherein the load balancer routes the request to an infrastructure instance of the first type or the second type based on a classification of the request if the request has been previously classified.

5. The system of claim 3, wherein the load balancer routes the request to an infrastructure instance of the second type if the request has not been previously classified.

6. A system for optimizing a cloud infrastructure in a cloud computing environment through client request classification, the system comprising:
one or more Software as a Service (SaaS) services executing on the cloud infrastructure in the cloud computing environment, wherein the cloud infrastructure comprises one or more infrastructure instances of a first type, and one or more infrastructure instances of a second type;
a load balancer that classifies each of a plurality of requests directed to the one or more SaaS services as requiring an infrastructure instance of the first type, or an infrastructure instance of the second type; and
a cache that stores the plurality of classified requests,
wherein classification information in the cache is provided for calculating statistics for use in optimizing the cloud infrastructure,
wherein the load balancer classifies a request using an algorithm that is based on calculating a marginal Euclidean distance, and a current request Euclidean distance, and then comparing the two Euclidean distances,
wherein the load balancer classifies the request as requiring a standard-compute infrastructure instance if the current request Euclidean distance is greater than the marginal Euclidean distance, and as requiring a high-compute infrastructure instance if the current request Euclidean distance is equal to or less than the marginal Euclidean distance.

7. The system of claim 6, wherein the marginal Euclidean distance represents a Euclidean distance between a plurality of threshold values of the cloud infrastructure and a threshold margin value.

8. The system of claim 6, wherein the current request Euclidean distance represents a Euclidean distance between a plurality of threshold values of the cloud infrastructure and a plurality of performance values of the request.

9. A method for optimizing a cloud infrastructure in a cloud computing environment through client request classification, the method comprising:
receiving, at a load balancer in the cloud computing environment, a plurality of requests directed to one or more Software as a Service (SaaS) services provisioned on the cloud infrastructure in the cloud computing environment, wherein the cloud infrastructure comprises one or more infrastructure instances of a first type, and one or more infrastructure instances of a second type;
classifying, using the load balancer, each of the plurality of requests as requiring an infrastructure instance of the first type, or an infrastructure instance of the second type;
storing each classified request in a cache; and
providing classification information in the cache for calculating statistics for use in optimizing the cloud infrastructure,
wherein the optimizing the cloud infrastructure comprises adjusting a number of infrastructure instances of the first type to optimally service requests based on a percentage of classified requests directed to an infrastructure instance of the first type.

10. The method of claim 9, wherein each of the first type of infrastructure instances is a high-compute infrastructure node, and where each of the second type of infrastructure instances is a standard-compute infrastructure node.

11. A method for optimizing a cloud infrastructure in a cloud computing environment through client request classification, the method comprising:
receiving, at a load balancer in the cloud computing environment, a plurality of requests directed to one or more Software as a Service (SaaS) services provisioned on a cloud infrastructure in the cloud computing environment, wherein the cloud infrastructure includes one or more infrastructure instances of a first type, and one or more infrastructure instances of a second type;
classifying, using the load balancer, each of the plurality of requests as requiring an infrastructure instance of the first type, or an infrastructure instance of the second type;
storing each classified request in a cache; and
providing classification information in the cache for calculating statistics for use in optimizing the cloud infrastructure,
wherein the load balancer constructs a request definition from a plurality of properties of each request, and determines whether the request has been previously classified based on whether the request definition exists in the cache.

12. The method of claim 11, wherein the load balancer routes the request to an infrastructure instance of the first type or the second type based on a classification of the request if the request has been previously classified.

13. The method of claim 11, wherein the load balancer routes the request to an infrastructure instance of the second type if the request has not been previously classified.

14. A method for optimizing a cloud infrastructure in a cloud computing environment through client request classification, the method comprising:
receiving, at a load balancer in the cloud computing environment, a plurality of requests directed to one or more Software as a Service (SaaS) services provisioned on a cloud infrastructure in the cloud computing environment, wherein the cloud infrastructure includes one or more infrastructure instances of a first type, and one or more infrastructure instances of a second type;
classifying, using the load balancer, each of the plurality of requests as requiring an infrastructure instance of the first type, or an infrastructure instance of the second type;
storing each classified request in a cache; and
providing classification information in the cache for calculating statistics for use in optimizing the cloud infrastructure,
wherein the load balancer classifies a request using an algorithm that is based on calculating a marginal Euclidean distance, and a current request Euclidean distance, and then comparing the two Euclidean distances, wherein the load balancer classifies the request as requiring a standard-compute infrastructure instance if the current request Euclidean distance is greater than the marginal Euclidean distance, and as requiring a high-compute infrastructure instance if the current request Euclidean distance is equal to or less than the marginal Euclidean distance.

15. The method of claim 14, wherein the marginal Euclidean distance represents a Euclidean distance between a plurality of threshold values of the cloud infrastructure and a threshold margin value.

16. A non-transitory computer readable storage medium, including instructions stored thereon which when read and executed by one or more computers cause the one or more computers to perform a method comprising:

receiving, at a load balancer in a cloud computing environment, a plurality of requests directed to one or more Software as a Service (SaaS) services provisioned on a cloud infrastructure in the cloud computing environment, wherein the cloud infrastructure comprises one or more infrastructure instances of a first type, and one or more infrastructure instances of a second type;

classifying, using the load balancer, each of the plurality of requests as requiring an infrastructure instance of the first type, or an infrastructure instance of the second type;

storing each classified request in a cache; and providing classification information in the cache for calculating statistics for use in optimizing the cloud infrastructure, wherein the optimizing the cloud infrastructure comprises adjusting a number of infrastructure instances of the first type to optimally service requests based on a percentage of classified requests directed to an infrastructure instance of the first type.

* * * * *

UNITED STATES PATENT AND TRADEMARK OFFICE
CERTIFICATE OF CORRECTION

PATENT NO. : 10,560,518 B2  
APPLICATION NO. : 15/464741  
DATED : February 11, 2020  
INVENTOR(S) : Agrawal et al.

Page 1 of 1

It is certified that error appears in the above-identified patent and that said Letters Patent is hereby corrected as shown below:

In the Drawings

On sheet 6 of 9, in Figure 6, Line 7, delete "Hlgh-compute" and insert -- High-compute --, therefor.

In the Specification

In Column 1, Line 23, delete "Wth" and insert -- With --, therefor.

In Columns 7-8, Line 59, delete "(compuetType" and insert -- (computeType --, therefor.

In Column 10, Line 20, delete "$CR_{RSPS} = Th_{RSPS}$" and insert -- $CR_{RSPS} = Th_{RSPS}$ --, therefor.

In Column 14, Line 45, delete "±1a" and insert -- ±1σ --, therefor.

In Column 14, Line 46, delete "a" and insert -- σ --, therefor.

In Column 14, Line 64, delete "p" and insert -- μ --, therefor.

Signed and Sealed this  
Twenty-fourth Day of November, 2020

Andrei Iancu  
*Director of the United States Patent and Trademark Office*